United States Patent [19]

Wilder, Jr.

[11] Patent Number: 4,521,849
[45] Date of Patent: Jun. 4, 1985

[54] PROGRAMMABLE HIT MATRICES USED IN A HARDWARE MONITORING INTERFACE UNIT

[75] Inventor: Richard P. Wilder, Jr., North Billerica, Mass.

[73] Assignee: Honeywell Information Systems Inc., Waltham, Mass.

[21] Appl. No.: 307,566

[22] Filed: Oct. 1, 1981

[51] Int. Cl.³ .............................. G06F 7/00; G06F 9/00
[52] U.S. Cl. ..................................................... 364/200
[58] Field of Search .............................. 364/900, 200

[56] References Cited

U.S. PATENT DOCUMENTS

| | | | |
|---|---|---|---|
| 3,906,454 | 9/1975 | Martin | 364/200 |
| 4,000,485 | 12/1976 | Barlow et al. | 364/200 |
| 4,030,075 | 6/1977 | Barlow | 364/200 |
| 4,040,035 | 8/1977 | Bennett et al. | 364/200 |
| 4,167,782 | 9/1979 | Joyce et al. | 364/200 |
| 4,195,342 | 3/1980 | Joyce et al. | 364/200 |
| 4,225,921 | 9/1980 | Hartley et al. | 364/200 |

*Primary Examiner*—Gareth D. Shaw
*Assistant Examiner*—John G. Mills
*Attorney, Agent, or Firm*—George Grayson; Nicholas Prasinos

[57] ABSTRACT

A hardware monitoring interface unit (HMIU) is coupled to a data processing unit and receives all information transferred between subsystems of the data processing unit. Programmable hit matrices (PHM's) include input latches for receiving the information, memory circuits for storing binary ONE's in locations addressed by predetermined portions of the information and output latches for storing the binary ONE's or "hit" signals read from the memory circuits. The "hit" signals are plug-wired into logic circuits and counters in a monitor to collect statistical data.

6 Claims, 17 Drawing Figures

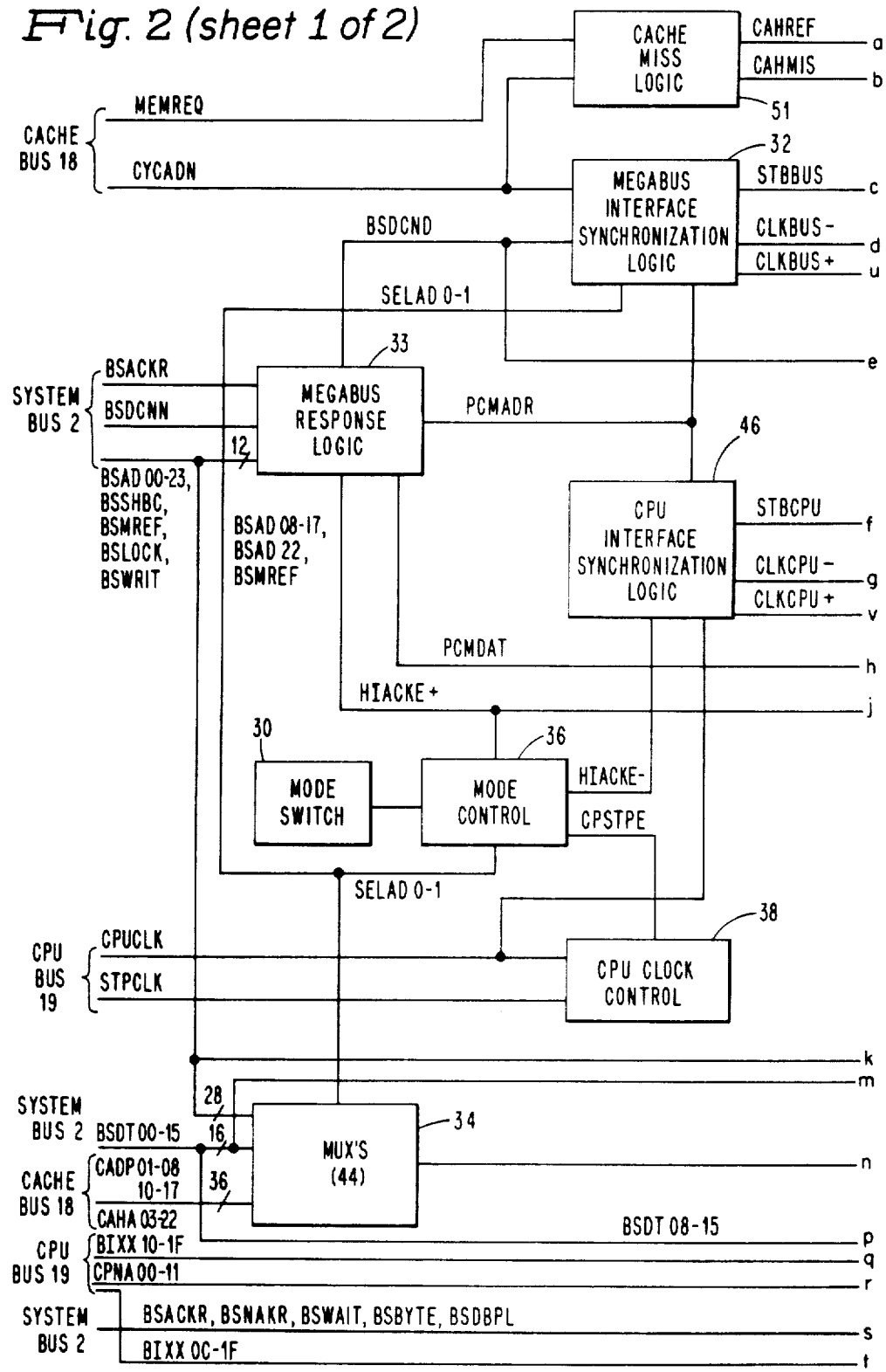
Fig. 2 (sheet 1 of 2)

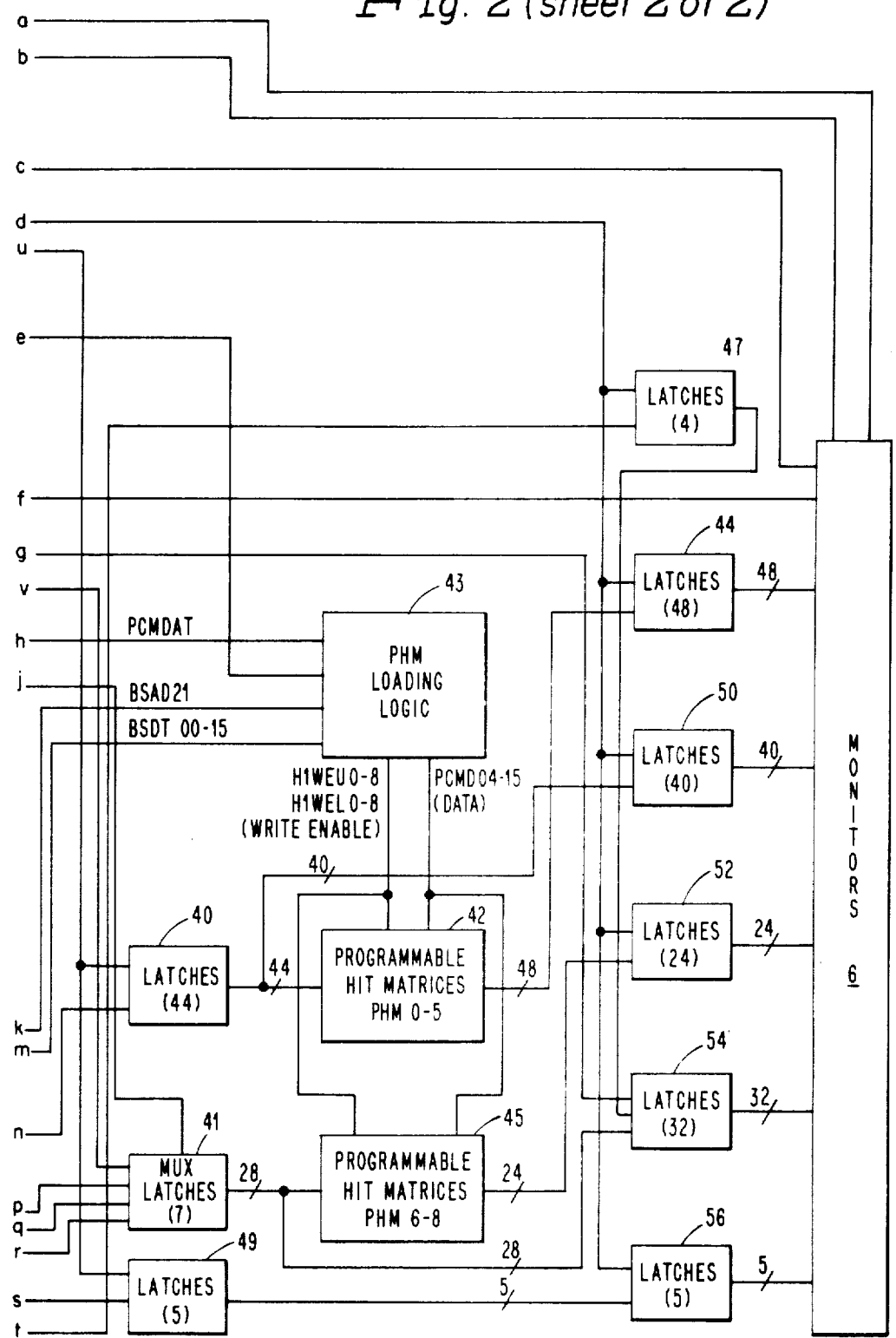
Fig. 2 (sheet 2 of 2)

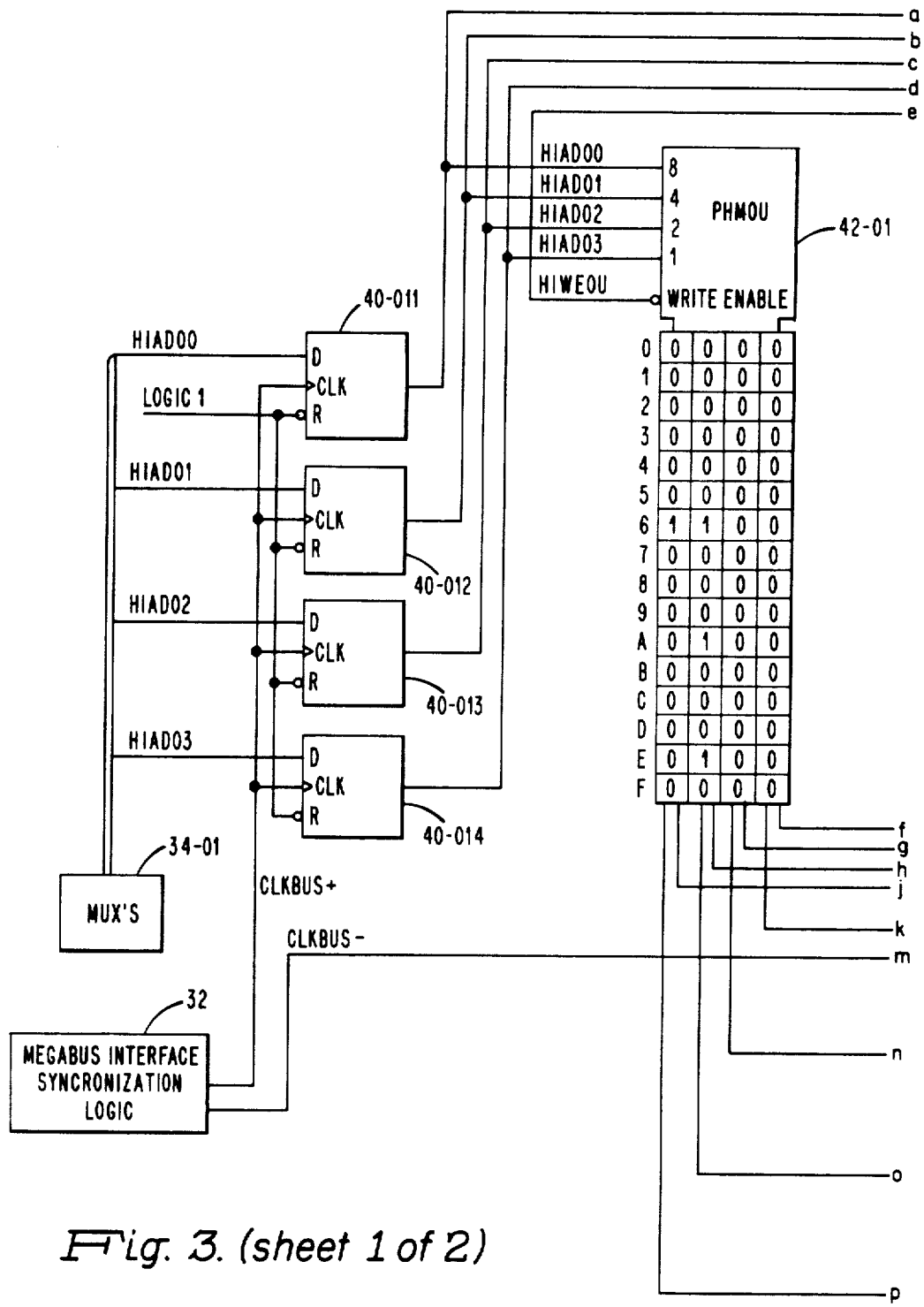
Fig. 3. (sheet 1 of 2)

| OPERATION | ADDRESS BUS 23 | | | | DATA BUS 25 | | |
|---|---|---|---|---|---|---|---|
| | 0 — 2 3 | | 22 23 | | 0 | | 15 |
| (a) MEMORY WRITE | | MEMORY ADDRESS | | | DATA | | |
| (b) MEMORY READ REQUEST | | MEMORY ADDRESS | 22 23 | | 0 — 9 10 | CHANNEL NUMBER OF SOURCE | 15 |
| (c) MEMORY READ RESPONSE | 0 — 8 | CHANNEL NUMBER OF DESTINATION | 17 18 | 23 | 0 | DATA | 15 |
| (d) I/O OUTPUT COMMAND | 0 — 8 | CHANNEL NUMBER OF DESTINATION | 17 18 | FUNCTION CODE 23 | 0 | DATA | 15 |
| (e) I/O INPUT COMMAND | 0 — 8 | CHANNEL NUMBER OF DESTINATION | 17 18 | FUNCTION CODE 23 | 0 — 9 10 | CHANNEL NUMBER OF SOURCE | 15 |
| (f) I/O INPUT RESPONSE | 0 — 8 | CHANNEL NUMBER OF DESTINATION | 17 18 | FUNCTION CODE 23 | 0 | DATA | 15 |
| (g) IOLD OUTPUT COMMAND | 0 MODULE NUMBER 7 8 | CHANNEL NUMBER OF DESTINATION | 17 18 | FUNCTION CODE 23 | 0 | ADDRESS | 15 |
| (h) IOLD COMMAND | 0 — 8 | CHANNEL NUMBER OF DESTINATION | 17 18 | FUNCTION CODE 23 | 0 S | RANGE | 15 |
| (i) CP ACTION REQUEST | 0 — 8 | CHANNEL NUMBER OF DESTINATION | 17 18 | ACTION CODE 23 | 0 | DATA | 15 |
| (j) INTERRUPT | 0 — 8 | CHANNEL NUMBER OF DESTINATION | 17 18 | 23 | 0 — 9 10 | CHANNEL NUMBER OF SOURCE | LEVEL NUMBER OF SOURCE 15 |

Fig. 5a-j.

| BUS CONTROL LINE | | | | TYPE OF BUS TRANSFER | FORMAT OF BUS INFORMATION (FIGURE) |
|---|---|---|---|---|---|
| BSMREF | BSLOCK | BSWRIT | BSSHBC | | |
| 0 | 0 | 0 | 0 | I/O INPUT REQUEST | 5e |
| 0 | 0 | 0 | 1 | I/O INPUT RESPONSE OR MEMORY READ RESPONSE | 5f, 5c |
| 0 | 0 | 1 | 0 | I/O OUTPUT OR INTERRUPT | 5d, 5j, 5g, 5h |
| 0 | 0 | 1 | 1 | ILLEGAL | |
| 1 | 0 | 0 | 0 | MEMORY READ REQUEST | 5b |
| 1 | 0 | 0 | 1 | ILLEGAL | |
| 1 | 0 | 1 | 0 | MEMORY WRITE | 5a |
| 1 | 0 | 1 | 1 | ILLEGAL | |
| 1 | 1 | 0 | 0 | MEMORY READ REQUEST, TEST & SET LOCK | 5b |
| 1 | 1 | 0 | 1 | MEMORY READ REQUEST, RESET LOCK | 5b |
| 1 | 1 | 1 | 0 | MEMORY WRITE, TEST & SET LOCK | 5a |
| 1 | 1 | 1 | 1 | MEMORY WRITE, RESET LOCK | 5a |

*Fig. 6.*

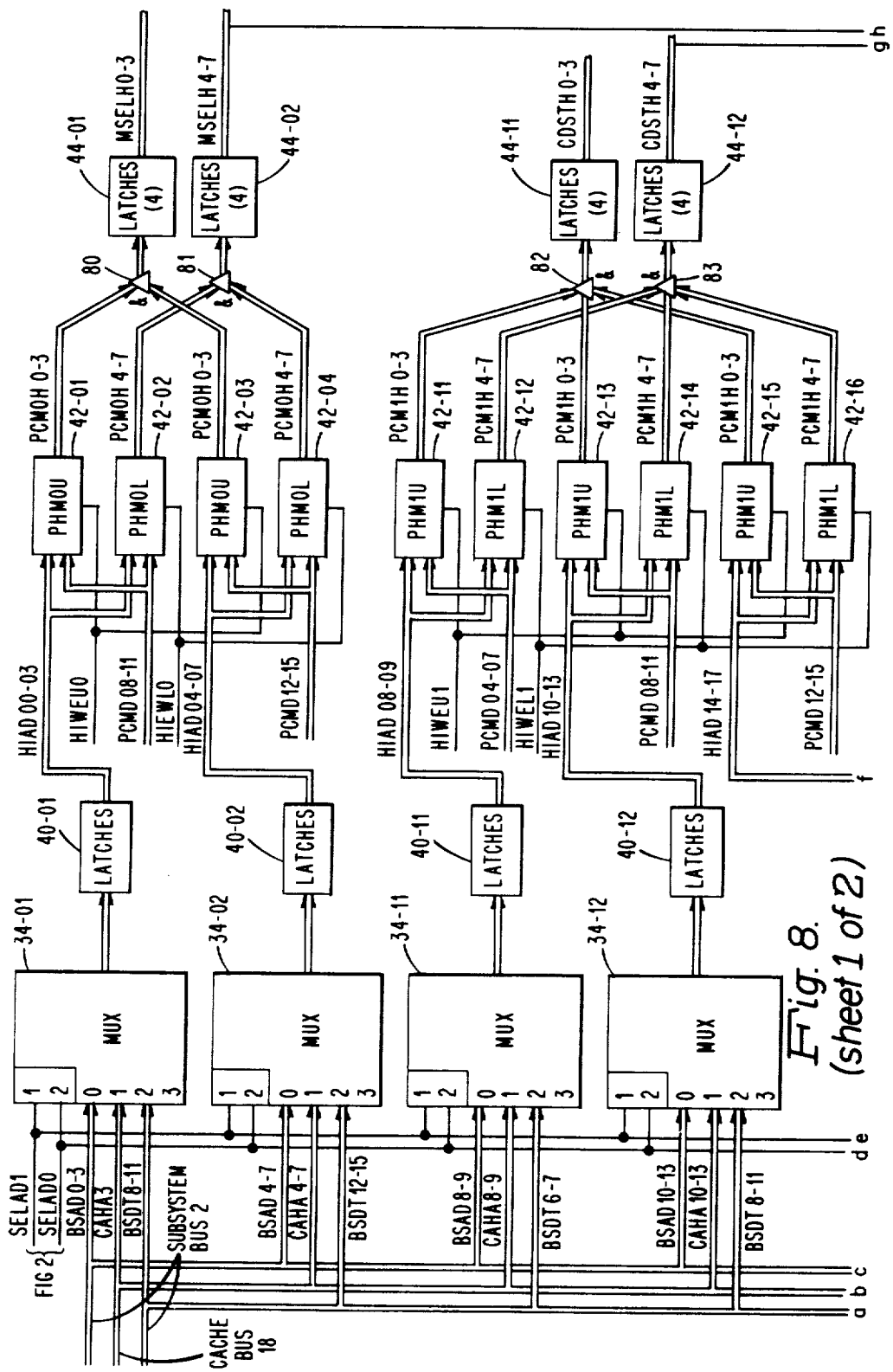
Fig. 8. (sheet 1 of 2)

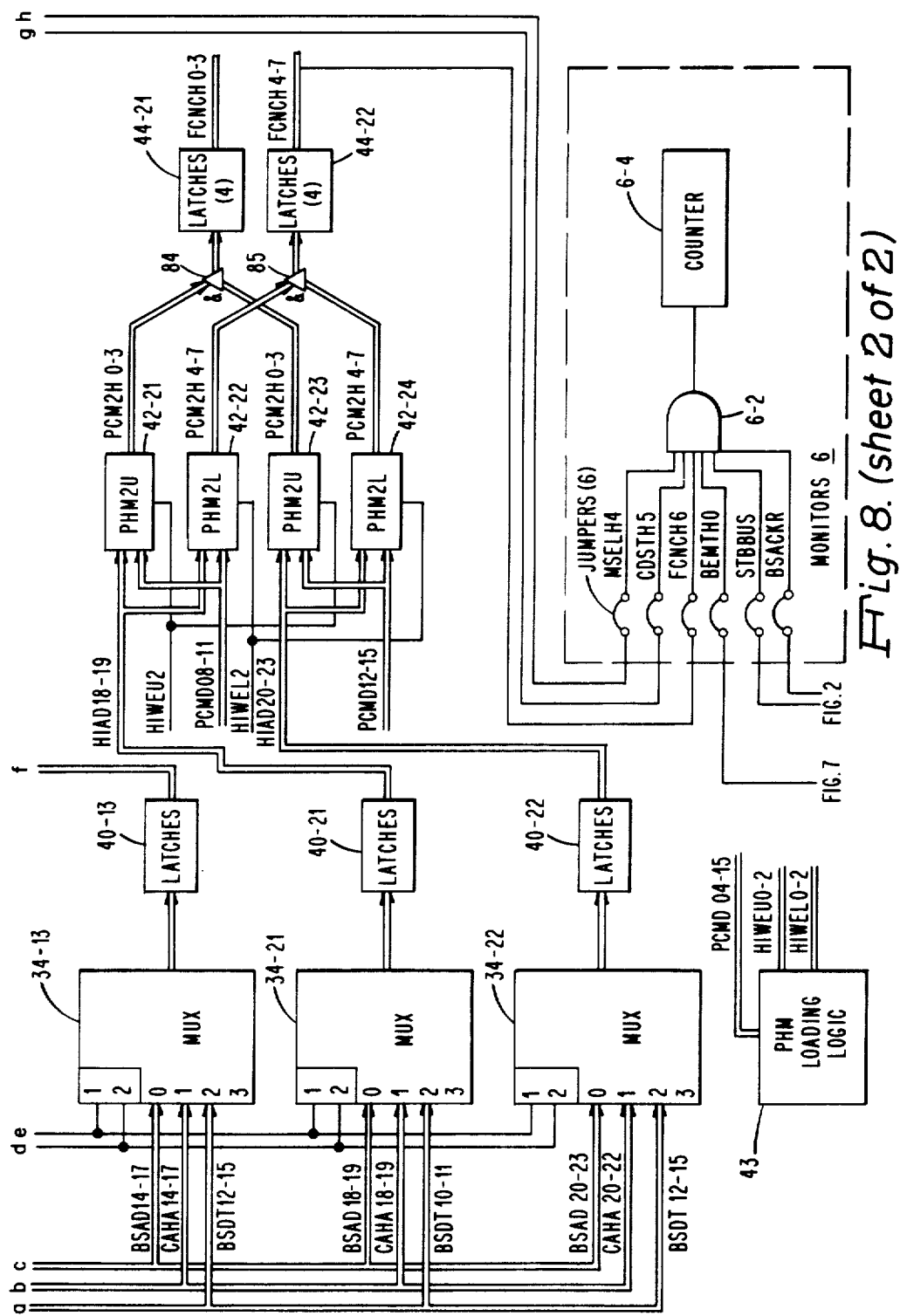

PROGRAMMABLE HIT MATRICES USED IN A HARDWARE MONITORING INTERFACE UNIT

RELATED APPLICATIONS

The following U.S. patent applications filed on an even date with the instant application and assigned to the same assignee as the instant application are related to the instant application and are incorporated herein by reference.

1. "Apparatus for Loading Programmable Hit Matrices Used in a Hardware Monitoring Interface Unit" by Richard P. Wilder, Jr., having U.S. Ser. No. 307,569 and filed on Oct. 1, 1981.

2. "Clocking System for a Computer Performance Monitoring Device" by Richard P. Wilder, Jr., having U.S. Ser. No. 307,565 and filed on Oct. 1, 1981.

3. "Clock Control of a Central Processing Unit from a Monitor Interface Unit" by Richard P. Wilder, Jr., having U.S. Pat. No. 4,438,490 and filed on issued on Mar. 20, 1984.

BACKGROUND OF THE INVENTION

1. Field of the Invention

The invention relates generally to the monitoring of activity of a data processing system and more specifically to the use of programmable hit matrices (PHM's) or memories for comparing information being transferred within the system with predetermined bits stored in the PHM for generating statistical data.

2. Description of the Prior Art

The throughput of prior art data processing systems were measured by writing software routines and measuring the time it took for the system to execute the routines. When new systems were designed, the same software routines were executed on the new and the old systems and the difference in running time noted. Central processor unit (CPU) limited and peripheral limited software routines were used to compare the throughput of the old and new systems. The execution time of a particular instruction was determined with an oscilloscope.

Monitoring devices were developed having counters and magnetic tape drives. Typical of these devices is the NCR Comten Model 7916. Probes coupled to the monitoring device are placed on the backboard pins of the system being monitored. The signals received by the monitoring device are wired to logic elements such as AND gates, OR gates, inverters and counters to develop performance data. These monitoring devices present a number of problems. Often many signals, each requiring a probe, are needed for the analysis. The pins on the system being monitored are difficult to locate, and the probes easily fall off. The prior art has the requirement of providing probe points for certain signals which increase the system cost.

It is also desirable for customer personnel to take performance measurements, particularly when the customers write their own software. Here the customer must rely on maintenance personnel to determine which backboard signals are needed and to place the probes on the proper backboard pins.

OBJECTS OF THE INVENTION

It is an object of the invention to have an improved data processing system interface monitor.

It is another object of the invention to have a monitoring system that may easily and readily be used by customer personnel.

It is still another object of the invention to easily and quickly adapt the monitoring system for different performance measurements.

SUMMARY OF THE INVENTION

A data processing system includes a number of subsystems, a main memory, a central processor unit (CPU), a cache memory and a number of peripheral controllers, all coupled in common to a system bus. The CPU is also directly coupled to cache. Information is transferred between subsystems via the system bus as well as between the CPU and cache.

A hardware monitoring interface unit (HMIU) is also coupled to the system bus as well as the CPU and cache for monitoring the information. The information is received by the HMIU and applied to a plurality of programmable hit matrices (PHM's).

A PHM includes input latches, memory circuits and output latches. Functionally, the PHM compares the input information stored in the input latches with predetermined information stored in the memory circuits to generate "hit" signals which are stored in the output latches when there is agreement.

Actually, the input information stored in the input latches addresses the memory circuits. The memory circuits store binary ONE's in predetermined address locations. The predetermined information selects a location in the memory circuit storing a binary ONE which generates the "hit" signal. Information that is not predetermined addresses locations storing binary ZERO's. Selected hit signals stored in the output latches are plug-wired into logic circuits, counters or storage devices in a monitor to generate the desired statistical data.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIGS. 5a-5j show the various system, cache and CPU bus information formats;

FIG. 6 is a table of the control signal codes which identify the information formats of FIGS. 5a-5j; and FIGS. 7 and 8 are logic diagrams of the PHM's used to describe a specific example to demonstrate the invention.

DESCRIPTION OF THE PREFERRED EMBODIMENT

Figure 1:
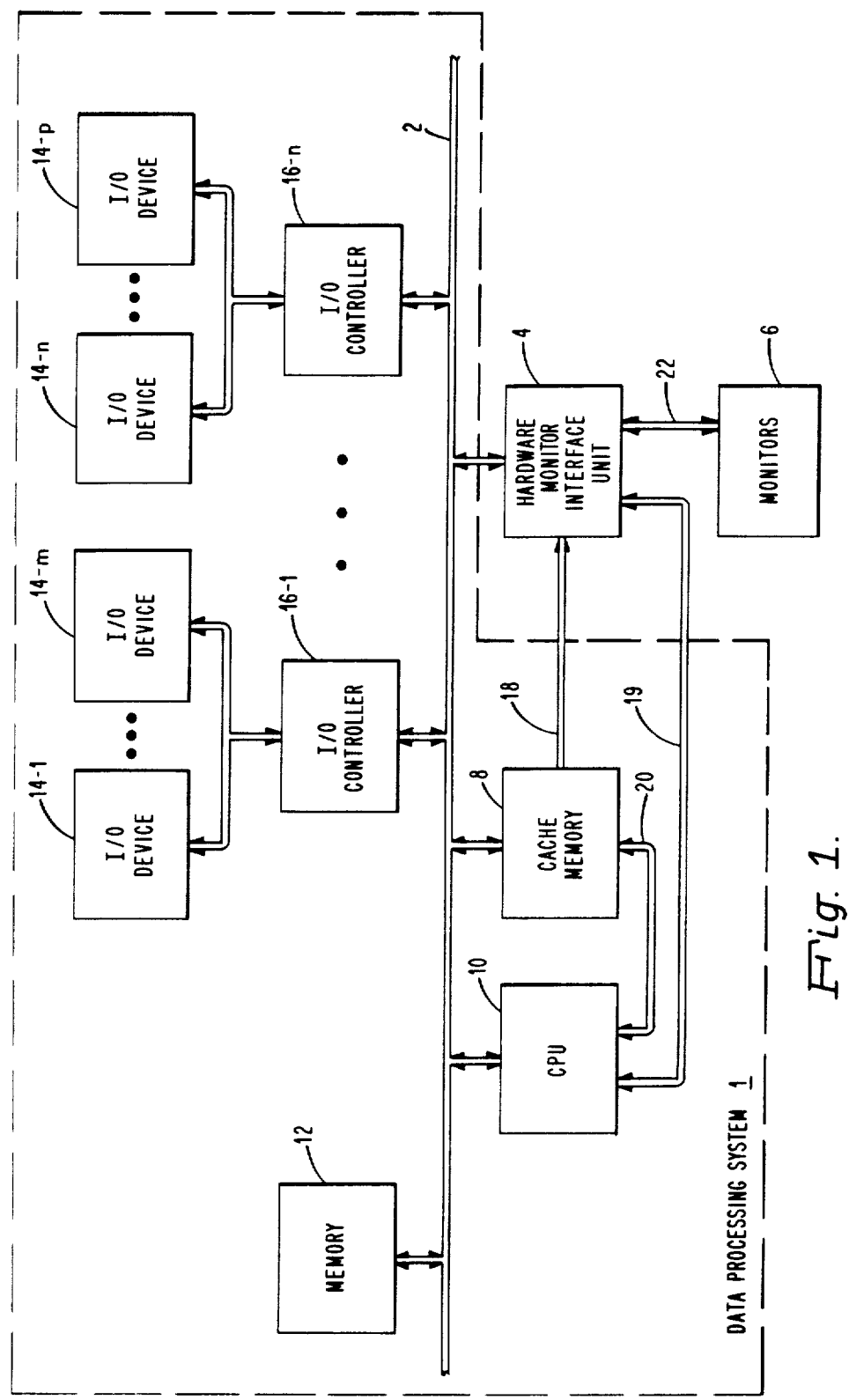
FIG. 1 is an overall block diagram of the data processing system, the hardware monitoring interface unit (HMIU) and the monitors.

FIG. 1 shows an overall block diagram of data processing system 1, a hardware monitor interface unit (HMIU) 4 and monitors 6. Data processing system 1 includes a memory 12, a plurality of I/O controllers 16-1 through 16-n, a central processing unit (CPU) 10, and a cache memory 8, all coupled in common to a system bus 2. I/O devices 14-1 through 14-m are coupled to I/O controller 16-1 and I/O devices 14-n through 14-p are coupled to I/O controller 16-n. The CPU 10 is coupled to the cache memory 8 by a bus 20. The CPU 10-cache 8 operation is described in U.S. Pat. No. 4,167,782 entitled "Continuous Updating of Cache Store".

The HMIU 4 is coupled to the system bus 2, to the CPU 10 by bus 19, and to the cache memory 8 by a bus 18. Monitors 6 is coupled to the HMIU 4 by a bus 22.

Memory 12 stores information including instructions and data. Cache 8 stores some of the information that is also stored in memory 12 that is most likely to be requested by CPU 10. Since cache 8 has a much faster access time than memory 12, use of the information stored in cache 8 by CPU 10 increases the system throughput over the CPU 10 requesting the information of memory 12. With the exception of the transfer of information over bus 20, all other information between subsystems is transferred over system bus 2. Since the HMIU 4 is coupled to system bus 2 as well as to CPU 10 and cache 8, HMIU 4 can sample all information passing through data processing system 1 and send desired portions of that information in monitors 6. For example, the HMIU 4 may send over bus 22 to monitors 6 signals indicating a memory 12 read cycle, an add instruction, a cache 8 "hit" or "miss", etc. This enables monitors 6 to generate performance information to indicate, for example, the overall system throughput, or whether the system is CPU or peripheral limited. The HMIU 4 is primarily used in providing information which allows the system to be timed to optimum performance. This information is a help to the hardware designer or software designer information to enable bottlenecks to be designed out of the hardware or software system and is also an aid in debugging both the hardware and software.

The monitors 6 which are commercially available as described supra may include a patchboard, a number of logic gates, some counters and possibly a magnetic tape unit. The HMIU 4 output signals terminate in the patchboard and may be plugged into the logic gates and counters. An example of the use of the HMIU 4 and monitors 6 is described infra.

Figure 2:
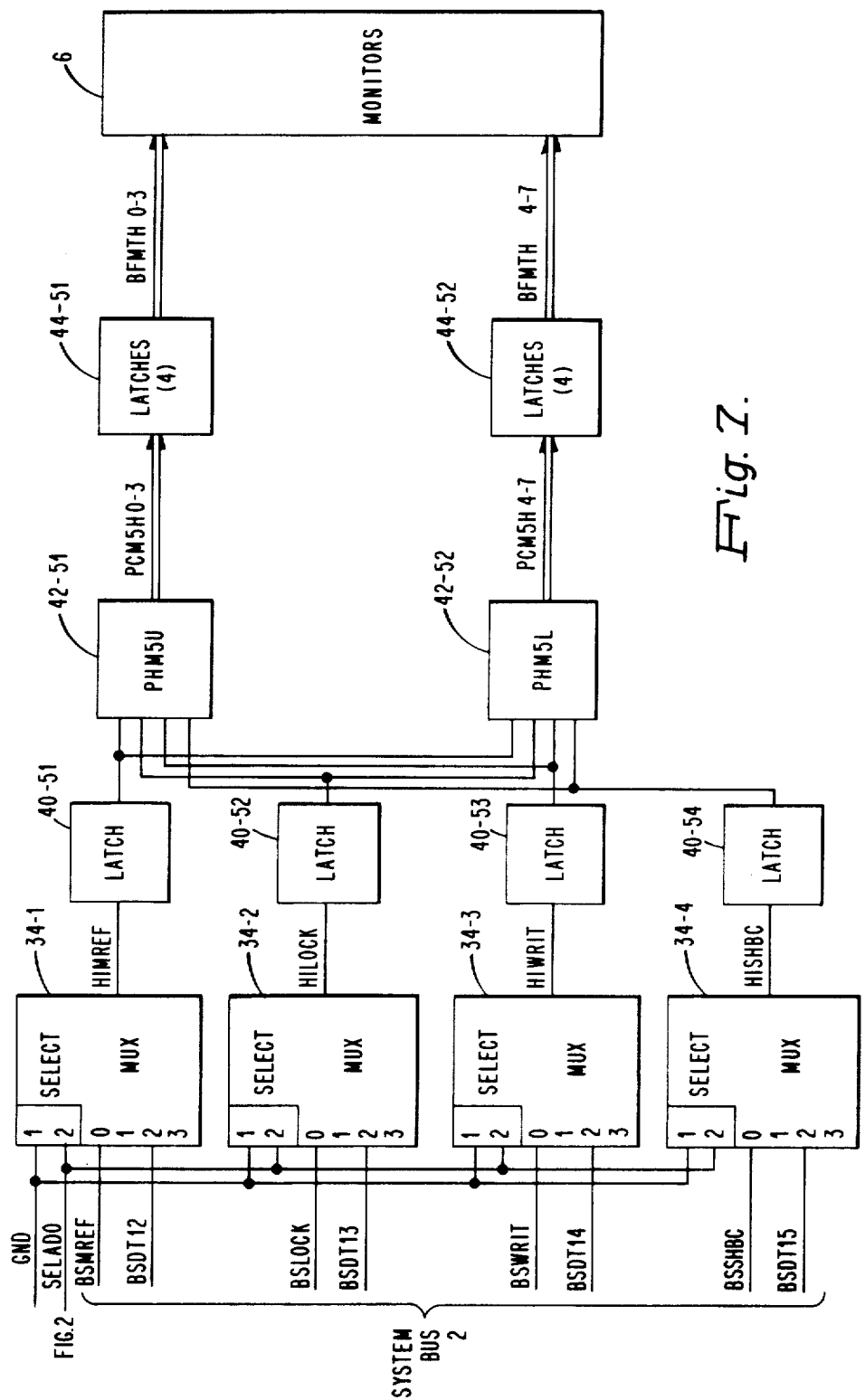
FIG. 2 is a block diagram of the HMIU.

FIG. 2 is a logic block diagram of the HMIU 4 which includes six programmable hit matrices (PHM's) 0-5 42 and three programmable hit matrices 6-8 45.

The 44 input signals to PHM 0-5 42 are stored in 44 latches 40 and the 28 input signals to PHM 6-8 45 are stored in 7 multiplexer (MUX) latches 41. The number over a slashed line indicates the number of signal lines. The latches 40 generate 44 signals to PHM 0-5 42 and 40 signals to latches 50.

The 48 output signals from PHM 0-5 42 are stored in 48 latches 44 and the 24 output signals from PHM 6-8 45 are stored in 24 latches 52. Each of the nine PHM's includes a number of Texas Instruments 3101A random access memories (RAM's). Each 3101A RAM stores 4 bits in each of 16 address locations. Each of the nine PHM's provides 8 output signals to monitors 6 via latches 44 and 52.

Figure 3:
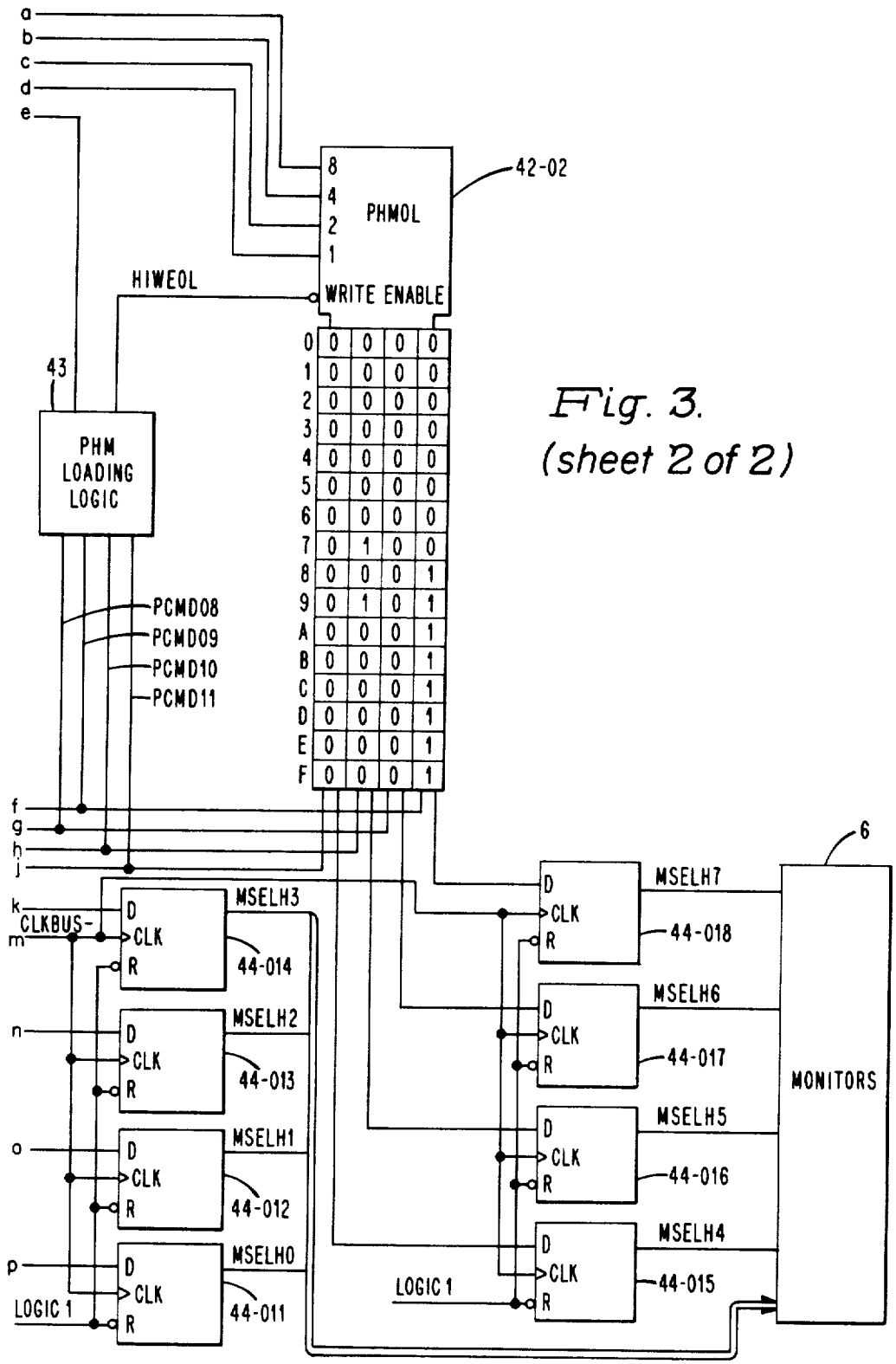
FIG. 3 is a logic diagram of a programmable hit matrix (PHM)

FIG. 3 shows a possible layout of PHMOU 42-01 and PHMOL 42-02 which can be viewed as a matrix of binary cells having 16 rows and 8 columns. PHMOU 42-01 has 4 columns and PHMOL 42-02 has 4 columns. Each of the 8 hit latches 44-011 through 44-018 is associated with one of the 8 columns. A binary ONE in a column of a selected row indicates a "hit". Latches 40-011 through 40-014 are set by signals H1AD 00-03 on the rise of clock signal CLKBUS+ from a megabus interface synchronization logic 32 to select one of the 16 rows. In the example in FIG. 3, a "hit" will set latch 44-011 when row $6_{16}$ is addressed and force signal MSELHO to logical ONE. A "hit" will set latch 44-012 when either row $6_{16}$, row $A_{16}$ or row $E_{16}$ are addressed and force signal MSELH1 to logical ONE. A "hit" will be indicated in hit register 44-016 when either row $7_{16}$ or row $9_{16}$ is addressed and a "hit" will set latch 44-018 when one of the rows $8_{16}$ through $F_{16}$ is addressed and force signal MSELH7 to logical ONE. Latches 44-011 through 44-018 are set on the rise of clock signal CLKBUS− from megabus interface synchronization logic 32. Latches 40-011 through 40-014 and 44-011 through 44-018 are 74S174 circuits.

Referring to FIG. 2, a mode switch 30 has 5 positions. In a load mode, the mode switch 30 in switch position 4 conditions mode control 36 to provide complementary signals H1ACKE+ and H1ACKE−. The load mode is described in copending related application Ser. No. 307,569 entitled "Apparatus for Loading Programmable Hit Matrices Used in a Hardware Monitoring Interface Unit". A megabus response logic 33 is responsive to signal HIACKE+ to receive system bus 2 control signals addressing the HMIU 4 for transferring data signals BSDT 00-15 from memory 12 through MUX's 34 and 41 and using PHM loading logic 43 for storing in the PHM's 0-5 42 and the PHM's 6-8 45. In switch positions 0 and 2, no such signals are generated making MUX's 34 responsive to the system bus 2 adress signals BSAD 00-23, data signals BSDT 00-15 and the control signals BSMREF, BSLOCK, BSWRIT and BSSHBC; and MUX latches 41 responsive to CPU bus 19 signals BIXX 10-1F and CPNA 00-11. In switch positions 1 and 3, select signals SELAD0-1 from mode control 36 activate MUX's 34 to condition the HMIU 4 to be responsive to the cache memory 8 signals CADP 01-08,10-17 received from cache bus 18. Switch positions 2 and 3 generate signal CPSTPE. CPU clock control 38 is responsive to signal CPSTPE to generate a STPCLK signal to slowdown or stop the CPU 10 clock. Switch position 2 conditions the HMIU 4 to be responsive to system bus 2 signals and switch position 3 conditions the HMIU 4 to be responsive to cache memory 8 signals received from cache bus 18. The 44 MUX's 34 are 74S153 circuits and the 7 MUX latches 41 are 74298 circuits.

Megabus interface synchronization logic 32 synchronizes the timing of the HMIU 4 to the system bus 2 in response to a timing signal BSDCND or to a load mode signal PCMADR, and to the cache bus 18 in response to the cache done timing signal CYCADN for generating the clock signal CLKBUS+, the delayed clock signal CLKBUS− and a strobe signal STBBUS. Mode control 36 signals SELADO-1 select the system bus 2 timing signal BSDCND, the load mode signal PCMADR, or the cache bus 18 timing signal CYCADN for generating the signals CLKBUS and STBBUS.

CPU interface synchronization logic 46 synchronizes the timing between the HMIU and CPU 10 via signal CPUCLK received from CPU 10 via CPU bus 19 for generating clock signal CLKCPU+, the delayed clock signal CLKCPU− and a strobe signal STBCPU. Signal HIACKE− disables the CPU interface synchronization logic 46 during the load mode. The CPU interface synchronization logic 46 and the megabus interface synchronization logic 32 are described in copending related application Ser. No. 307,565, filed Oct. 1, 1981 entitled "Clocking System for a Computer Performance Monitoring Device".

CPU clock control 38 receives the CPUCLK clock signal from the CPU 10 over CPU bus 19 and sends back a STPCLK signal. The CPU clock control 38 is responsive to a CPSTPE signal from the mode control 36 and also a manually operated potentiometer to control the clock rate of the STPCLK signal. CPU 10 is responsive to the STPCLK signal received over CPU bus 19 to operate in either a slowdown or a stop mode. The CPU clock control 38 is described in copending related U.S. Pat. No. 4,438,490 entitled "Clock Control of a Central Processing Unit from a Monitor Interface Unit".

Mode switch 30 position 4 selects the load mode operation resulting in mode control 36 generating signal HIACKE+. This enables megabus response logic 33 to receive information on system bus 2 read from memory 12 which is addressed to the HMIU 4. Signals BSAD 08-17 designate a channel number. Switches (not shown) in the megabus response logic 33 are set to respond to an assigned channel number. When that assigned channel number appears on the system bus 2, megabus response logic 33 generates signal PCMADR on a first system bus 2 cycle and signal PCMDAT on a second system bus 2 cycle. Signal PCMADR is applied to the megabus interface synchronization logic 32 and the CPU interface synchronization logic 46 to generate clock signals and strobe signals during the first system bus 2 cycle. Signal PCMDAT is applied to PHM loading logic 43. The data signals BSDT 00-15 are clocked into the PHM loading logic 43 by signal PCMDAT. Address signal BSAD 21, signal PCMDAT and the data signals BSDT 00-03 select one of the six PHM's 0-5 42 or one of the three PHM's 6-8 45 into which signals BSDT 04-15 received on the second system bus 2 cycle are written at an address specified by signals BSDT 00-15 received during the first system bus 2 cycle applied to MUX's 34 for writing into PHM's 0-5 42 and signals BSDT 04-15 applied to MUX latches 41 for writing onto PHM's 6-8 45. The system bus 2 operation including channel number is described in U.S. Pat. No. 4,030,075 entitled "Data Processing System Having Distributed Priority Network".

An ordered pair of separate system 2 bus cycles are required for writing into each address location for each desired PHM. Since the 3101A RAM has 4 outputs and 8 outputs are required for each of the nine PHM's, the 3101A RAM's operate in pairs similar to RAM's 42-01 and 42-02 of FIG. 3. One of the write enable signals H1WEU 0-8 from PHM loading logic 43 of FIG. 2 selects the upper random access memory in the selected PHM. One of the write enable signals H1WEL 0-8 selects the lower random access memory in the selected PHM.

The 44 MUX's 34, under the control of the mode control signals SELAD 0-1 select the system bus 2 address signals BSAD 00-23, the system bus 2 data signals BSDT 00-15, the cache bus 18 address signals CAHA 03-22 and the cache bus 18 data signals CADP 01-08,10-17. Also applied to MUX's 34 are the system bus 2 control signals BSMREF, BSLOCK, BSWRIT and BSSHBC. Signal BSMREF indicates a memory 12 system bus 2 cycle, signal BSWRIT indicates a system bus 2 write cycle, signal BSLOCK indicates that the memory 12 is locked out and not available to memory requests since the memory 12 has not completed a multicycle transfer, and signal BSSHBC indicates a second half bus cycle, that is, a response to a previous bus cycle which requested information. These operations are described in U.S. Pat. No. 4,000,485 entitled "Data Processing System Providing Locked Operation of Shared Processes".

The outputs of MUX's 34 are stored in 44 latches 40 on the rise of clock signal CLKBUS+ from megabus interface synchronization logic 32. The 44 output signals of latches 40 are applied to the address terminals of PHM 0-5 42. The 40 output signals of latches 40 representative of the 24 bus address signals and the 16 data signals received over either system bus 2 or cache bus 18 are stored in the 40 latches 50 on the rise of the CLKBUS— clock signal for transfer to monitors 6. Four of the MUX latches 41 store the 16 system bus 2 data signals BSDT 00-15 or the 16 CPU bus 19 signals BIXX 10-1F from the CPU 10 internal bus for addressing PHM's 6 and 7 45. The 4 CPU bus signals BIXX OC-OF are stored in 4 input latches 47 on the rise of the clock signal CLKCPU— and stored in 4 of the 32 latches 54 on the next rise of the CLKCPU— clock signal. The remaining three of the MUX latches 41 store the data signals BSDT 08-15 or the CPU 10 control store address signals CPNA 00-11 received over CPU bus 19 for addressing PHM 8 45. These signals are stored in MUX latches 41 on the rise of clock signal CLKCPU+. The PHM 6-8 output signals are stored in 24 latches 52 on the rise of the clock signal CLKCPU—. The output signals of the 7 MUX latches 41 are stored in 28 latches 54 on the rise of the clock signal CLKCPU—.

Figure 4:
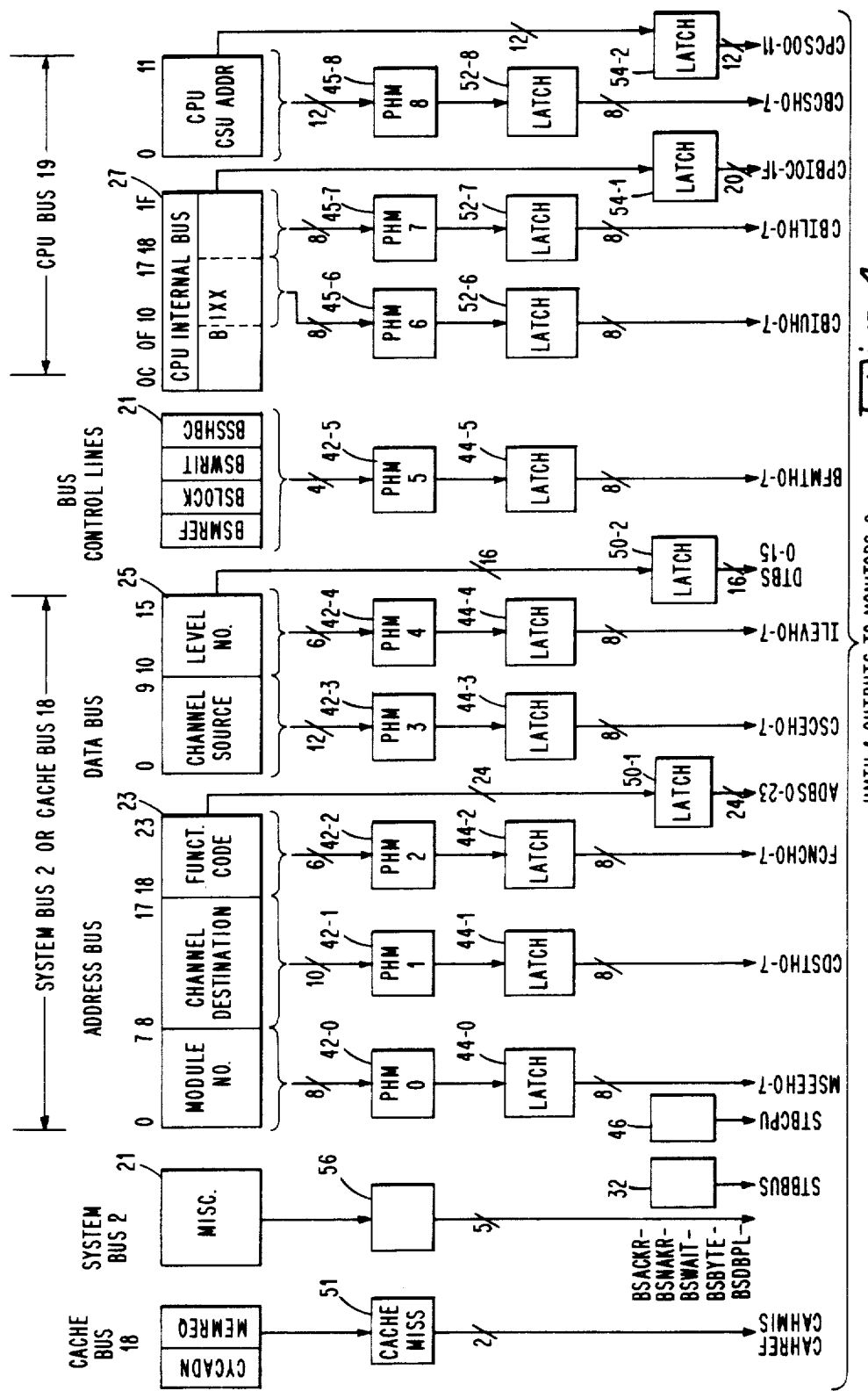
FIG. 4 shows the coupling between the PHM's and the system bus 2, the cache bus 18 and the CPU bus 19 signals, and the output signals to the monitors.

Five control signals described infra are received via system bus 2 stored in 5 latches 49 on the rise of the clock signal CLKBUS+. These control signals are shown in FIG. 4. The outputs of latches 49 are stored in latches 56 on the rise of the CLKBUS— signal for transfer to monitors 6. The latches 40, 44, 49, 50, 52, 54 and 56 are 74S174 circuits.

A cache miss logic 51 receives a MEMREQ signal and the CYCADN signal from cache 8 via cache bus 18. The MEMREQ signal indicates that the CPU 10 requested information from cache 8 which was not stored in cache 8. Signal CYCADN indicates that the information was found in or received by cache 8 and sent to CPU 10. Cache miss logic 51 generates signal CAHREF to indicate a cache 8 request and a signal CAHMIS to indicate that the information was not found in cache 8. Signals CAHREF and CAHMIS are applied to monitors 6 to measure the cache 8 "hit" rate.

The 149 output signals from latches 44, 50, 52, 54 and 56, two strobe signals STBBUS and STBCPU, and the two cache miss logic 51 signals CAHREF and CAHMIS are applied to the monitors 6.

Referring to FIG. 3, the PHM loading logic 43 generates the write enable signal H1WEOL to write into PHMOL 42-02 or the write enable signal H1WEOU to write into PHMOU 42-01. Signals BSDT 00-15 are stored in the PHM loading logic 43, FIG. 2, on the second system bus 2 cycle and written into PHMOU 42-01 or PHMOL 42-02 via signals PCMD 08-11 at an address specified by signals H1AD 00-03 received and stored in latches 40-011 through 40-014 from MUX's 34-01 during the first system bus 2 cycle.

FIG. 4 is a block diagram showing the information sent by the HMIU 4 to the monitors 6. The table below describes the function of the 5 system bus 2 signals received over system bus 2 and stored in latches 49 for transfer to monitors 6 via latches 56:

BSACKR—Acknowledges the acceptance of a bus transfer.
BSNAKR—Refuses a bus transfer.
BSWAIT—Indicates that the subsystem is busy and cannot accept the bus transfer at this time.
BSBYTE—Indicates that the information on the bus is a byte and not a word.
BSBPL—Indicates that a double word was requested of memory 12.

The following two cache signals are generated in cache miss logic 51:

CAHREF—Indicates that the CPU 10 referenced the cache memory 8 by the HMIU 4 receiving a cache done signal CYCADN over cache bus 18 to strobe the data into the CPU 10 from either cache 8 or memory 12.
CAHMIS—Indicates that the cache memory 8 generated a memory request MEMREQ signal over cache bus 18 thereby indicating a "cache miss".

FIGS. 5a-5j show the various formats received by HMIU 4. FIG. 4 uses the address format of FIG. 5g and the data format of FIG. 5j to describe the relationship of the PHM's to the system bus 2 or cache bus 18 information. This is an arbitrary selection.

Referring to FIG. 4, the input latches 40 and 49 and the MUX latches 41 are not shown. When MUX's 34 couple system bus 2 to the HMIU 4, address bus 23 signals BSAD 00-07 address PHM 0 42-0 to verify the memory 12 modules.

When the cache bus 18 is coupled to the HMIU 4 by MUX's 34, address bus 23 signals CAHA 03-07 address PHM 0 42-0 to verify the memory 12 module. The PHM 0 42-0 output signals are stored in 8 latches 44-0. The latches 44-0 output signals MSELHO-7 are applied to monitors 6 to designate a hit on designated memory 12 module or modules.

When the MUX's 34 couple system bus 2 to the HMIU 4, address bus 23 signals BSAD 08-17 address PHM 1 42-1 to, for example, verify the channel number of the subsystem which is the destination of the information being transferred over system bus 2 during this bus cycle. When the cache bus 18 is coupled to the HMIU 4, address bus 23 signals CAHA 08-17 address PHM 1 42-1 to, for example, verify the destination channel numbers. The PHM 1 42-1 output signals are stored in 8 latches 44-1. The latches 44-1 output signals CDSTHO-7 are applied to monitors 6 to designate a "hit" on channel member.

When the MUX's 34 couple system bus 2 to the HMIU 4, address bus 23 signals BSAD 18-23 address PHM 2 42-2 to, for example, verify the function code. The function code specifies the function to be performed by an I/O device 14-n and whether it is input or output data transferred from or to the device. When the cache bus 18 is coupled to the HMIU 4, address bus 23 signals CAHA 18-22 address PHM 2 42-2 to, for example, verify the function code. The PHM 2 42-2 output signals are stored in 8 latches 44-2. The latches 44-2 output signals FCNCHO-7 are applied to monitors 6 to designate a "hit" on function code.

The 24 address bus 23 signals are applied through the MUX's 34 to 24 latches 50-1 of latches 50, FIG. 2. The output signals ADBSO-23 are applied to monitors 6.

When the MUX's 34 couple system bus 2 to the HMIU 4, data bus 25 signals BSDT 00-09 address PHM 3 42-3 to, for example, verify the channel number of the source. When the cache bus 18 is coupled to the HMIU 4, data bus 25 signals CADP 01-08, 10-11 address PHM 3 42-3. The PHM 3 42-3 output signals are stored in 8 latches 44-3. The latches 44-3 output signals CSCEHO-7 are applied to monitors 6 to designate the specified source channel number "hit".

When the MUX's 34 couple system bus 2 to the HMIU 4, data bus 25 signals BSDT 10-15 address PHM 4 42-4 to, for example, verify the level number which is an indication of the priority of an interrupt. A lower level number indicates a higher priority. When the cache bus 18 is coupled to the HMIU 4, data bus 25 signals CADP 12-17 address PHM 4 42-4. The PHM 4 42-4 output signals are stored in 8 latches 44-4. The latches 44-4 output signals ILEVH 0-7 are applied to monitors 6 to designate an interrupt priority level number.

The 16 data bus 25 signals are applied through MUX's 34 to 16 latches 50-2 of latches 50, FIG. 2. The output signals DTBS 00-15 are applied to monitors 6.

When the MUX's 34 couple system bus 2 to the HMIU 4, the control bus 21 signals BSMREF, BSLOCK, BSWRIT and BSSHBC address PHM 5 42-5. The PHM 5 42-5 output signals are stored in latches 44-5. The latches 44-5 output signals BFMTH 0-7 are applied to monitors 6.

MUX latches 41 select signals BIXX 10-17 from CPU bus 19 for addressing PHM 6 45-6 and signals BIXX 18,19,1A-1F from CPU bus 19 for addressing PHM 7 45-7. CPU bus 19 brings over, for example, the 4 hexadecimal digits making up the instruction operation code, 2 of the 4 hexadecimal digits address PHM 6 45-6, and 2 of the 4 hexadecimal digits address PHM 7 45-7. The PHM 6 45-6 and PHM 7 45-7 output signals are stored in latches 52-6 and 52-7, respectively, and the output signals CBIUH 0-7 and CBILH 0-7 are applied to the monitors 6 to indicate an operation code "hit", the operation code received over internal CPU bus 27 is stored in 16 latches 54-1 of latches 54, FIG. 2. Signals BIXX OC-OF are stored in 20 output latches 54-1 and are transferred to monitors 6 as signals CPBI OC-1F.

Mux latches 41 also store the CPU 10 control store address signals CPNA 00-11 from bus 19 for addressing PHM 8 45-8. The PHM 8 45-8 output signals are stored in 8 latches 52-8. The latches 52-8 output signals CPCSH 0-7 are applied to monitors 6 to indicate control store address "hits". The control store address is also stored in latches 54-2 of latches 54, FIG. 2, for transfer to monitors 6 as signals CPCS 00-11.

FIGS. 5a-5j show the varius address bus 23 and data bus 25 formats, a combination of which is shown in FIG. 4. These formats are further described in the Honeywell Level 6 Microcomputer Handbook, Order No. AS22.

FIG. 5a shows the formats of the information on system bus 2 during a memory 12 write cycle. Bit position 23 of address bus 23 indicates if the data bus 25 is in a byte or word format.

FIG. 5b shows the format of the information on system bus 2 during a first cycle of a memory 12 read sequence. FIG. 5c shows the format during a second cycle of a memory read sequence.

FIG. 5d shows the format of the information on the system bus 2 during an I/O output command.

FIG. 5e shows the format of the information on system bus 2 during an I/O input command and FIG. 5f shows the format of the response.

FIGS. 5g and 5h show the two system bus 2 cycles of information responsive to an I/O load command.

FIG. 5i shows the system bus 2 information requesting a CPU 10 action.

FIG. 5j shows the system bus 2 information during an interrupt by one of the devices 14.

FIG. 6 shows formats of the different types of bus transfers as identified by the control signals.

The following example shows how the HMIU 4 monitors the data processing system 1 operation.

Assume it is required to count the number of times the system writes into memory 12 at address location $00004_{16}$. Referring to FIGS. 5 and 6, for a memory write operation signal BSMREF is at logical ONE, signal BSMLOCK is either at logical ONE or logical ZERO indicating a "don't care", signal BSWRIT is at logical ONE and signal BSSHBC is a "don't care".

During the load operation, binary ONE's are written into address locations $1010_2$, $1011_2$, $1110_2$ and $1111_2$ or $A_{16}$, $B_{16}$, $E_{16}$ and $F_{16}$ of PHM5U 42-51 or PHM5L 42-52 of FIG. 7. The addresses are selected during the load mode by data signals BSDT 12-15 since select signal SELADO from mode control 36 selects input terminal 2 of MUX's 34-1 through 34-4. The MUX's 34-1 through 34-4 output signals H1MREF, H1LOK, H1WRIT and H1SHBC are stored in latches 40-51 though 40-54 to address PHM5U 42-51 and PHM5L 42-52. The signals for writing the binary ONE's in the selected addresses are not shown. Assume that the binary ONE's indicating a "hit" are written into PHM5U 42-51 such that signal PCM5HO is stored in one of the latches 44-51 and appears as signal BEMTHO. During the load mode, the binary ONE's representing a "hit" could have been written in PHM5U 42-51 or PHM5L 45-52 to appear on any other of the signals PCM5H 1-7 and BFMTH 1-7 when address locations $A_{16}$, $B_{16}$, $E_{16}$ and $F_{16}$ are addressed. The choice is arbitrary.

Address bus 23 of FIG. 5 will receive the information in the format of FIG. 5a. Signals BSAD 03-22 indicates an address location $00004_{16}$. Signal BSAD 20 is at logical ONE and signals BSAD 03-19,21-22 are at logical ZERO.

Referring to FIG. 8, during a load operation binary ONE's indicating a "hit" are written into address location $0_{16}$ of PHMOL's 42-02 and 42-04 so as to appear on signal MSELH4, the output of one of the latches 44-02. As described supra, this is arbitrary; the binary ONE's could be written to appear on signals MSELH 0-3,5-7. During the load operation, signal SELADO is at logical ONE resulting in MUX's 34-01 and 34-02 selecting signals BSDT 8-15. Signals BSDT 8-15 select address location $00_{16}$. Similarly, during the load operation address locations $0_{16}$ of PHMIL's 42-12, 42-14 and 42-16 are addressed by data signals BSDT 06-15 to write a binary ONE so that signal CDSTH 5-7, the output of one of the latches 44-12, is active. Also, during the load operation address location $0_{16}$ of PHM2L 42-22 and address locations $8_{16}$ and $9_{16}$ of PHM2L 42-24 (signal BSAD 20 is at logical ONE and signal BSAD 23 is at "don't care") are addressed by signals BSDT 10-15 applied to MUX's 34-21 and 34-22 to write binary ONE's in PHM2L's 42-22 and 42-24 so that signal FCNCH6, the output of latches 44-22, is active.

When the HMIU 4 is monitoring the system bus 2, signals BSAD 0-23 are applied through MUX's 34-01, 34-02, 34-11, 34-12, 34-13, 34-21 and 34-22 to be stored in their respective latches 40-01, 40-02, 40-11, 40-12, 40-13, 40-21 and 40-22 since signals SELADO-1 are both at logical ZERO. Assuming a memory 12 write operation, signal BEMTHO, FIG. 7, at logical ONE, then signals BSAD 0-2 are at logical ZERO and the memory 12 address location signals BSAD 3-22 indicate the memory 12 address location.

Signals BSAD 0-3 at logical ZERO applied to MUX's 34-01 are stored in latches 40-01 as logical ZERO's. Signals H1AD 00-03 at logical ZERO's are applied to the address terminals of PHMOU 42-01 and PHMOL 42-02 where locations $0_{16}$ are addressed.

Signal PCMOH4, an output of PHMOL 42-02, is forced to logical ONE. Similarly, signals BSAD 4-7 are logical ZERO are stored in latches 40-02 through MUX's 34-02. Signals H1AD 04-07 address location $0_{16}$ of PHMOU 42-03 and PHMOL 42-04. Signal PCMOH4, an output of PHMOL 42-04, is forced to logical ONE. Both signals PCMOH4 are applied to an AND junction 81. If both are at logical ONE, then a selected latches of latches 44-02 is set and signal MSELH4 is forced to logical ONE.

Signals BSAD 8-9, BSAD 10-13 and BSAD 14-17 at logical ZERO applied to MUX's 34-11, 34-12 and 34-13 respectively are stored in latches 40-11, 40-12 and 40-13 respectively. The PCM1H5 output signals at logical ONE from PHM1L 42-12, 42-14 and 42-16 are applied to an AND junction 83. A selected latch of latches 44-12 is set, forcing signal CDSTH5 to logical ONE.

Signals BSAD 18-19, 21-22 at logical ZERO, signal BSAD 20 at logical ONE and signal BSAD 23 at either logical ONE or logical ZERO (a "don't care" indication) generate signal FCNCH6 at logical ONE via MUX's 34-21 and 34-22, latches 40-21 which stores $0_{16}$ and latches 40-22 which stores $8_{16}$ or $9_{16}$. Signals H1AD 18-19,21-22 are at logical ZERO, signals H1AD 20 are at logical ONE and signal H1AD 23 is at either logical ONE or logical ZERO. The output signals PCM2H6 from PHM2L 42-22 and PHM2L 42-24 at logical ONE applied to AND junction 85 set a selected one of the latches 44-22 forcing signal FCNCH6 to logical ONE.

Signals MSELH4, CDSTH5, FCNCH6 and BEMTH0 at logical ONE indicating a memory 12 write cycle at address location 00004 are plug-wired to an AND gate 6-2 in monitors 6. When signal BSACKR, FIG. 2, applied to AND gate 6-2 is at logical ONE indicating that the memory 12 acknowledged the system bus 2 cycle and when the strobe signal STBBUS from megabus interface synchronization logic 32, FIG. 2, is at logical ONE, counter 1 is incremented.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system including a main memory subsystem, a plurality of I/O controllers, a central processing unit (CPU) and a cache memory, all coupled in common to a system bus, the system comprising:

a monitor interface unit coupled to said system bus, said central processor unit by a CPU bus, and said cache memory by a cache bus for monitoring information signals and transferring hit signals representative of predetermined signals of said information signals to monitors for generating performance data, said monitor interface unit comprising:

bus selection means for selecting said information signals from said system bus or from said cache bus; wherein said bus selection means comprises:

mode switching means for generating a selection signal for selecting said information signals from said system bus or said cache bus; and multiplexer means coupled to said mode switching means and responsive to said selecting signal in a first state for selecting system bus signals representative of said information signals from said system bus and said selection signal in a second state for selecting cache bus signals representative of said information signals from said cache bus;

interface input storage means coupled to said bus selection means for temporarily storing said information signals from said system bus and said cache bus and coupled to said CPU for storing said information signals from said CPU bus; wherein said input storage means comprises:

input latch means coupled to said multiplexer means for storing said system bus signals when said multiplexer means is responsive to said system bus and storing said cache bus signals when said multiplexer means is responsive to said cache bus for generating a first set of address signals to the programmable hit matrix memory, and for storing CPU bus signals from said CPU bus for generating a second set of address signals to the programmable hit matrix memory;

programmable hit matrix memory coupled to said input storage means and addressable by said information signals from said interface input storage means for generating said hit signals in response to said predetermined signals; and of said information signals; and the system further comprising monitor means coupled to said output storage means and responsive to the hit signals for generating statistical data regarding ocurrence of said predetermined signals on the system bus, CPU bus and cache bus.

2. The data processing system of claim 1 wherein said programmable hit matrix memory comprises:

a plurality of random access memories means, each having a plurality of bit locations organized in a plurality of rows, each of said plurality of rows having a plurality of columns for storing a plurality of binary ONE bits in predetermined ones of said plurality of bit locations;

a first of said plurality of random access memories being responsive to said first set of programmable hit matrix memory address signals and a second of said plurality of random access memories being responsive to said second set of programmable hit matrix memory address signals each of the respective sets of address signals selecting one of said plurality of rows from a respective random access memory and generating one of said hit signals for each of said columns in which one of said plurality of binary ONE bits is stored in the selected row.

3. The data processing system of claim 2 wherein said output storage means comprises:

a first plurality of output latches coupled to said first of said plurality of random access memories for storing each of said hit signals from said each of said plurality of columns for transfer to said monitors; and a second plurality of output latches coupled to said second of said plurality of random access memories for storing each of said hit signals from said each of said plurality of columns for transfer to said monitor.

4. A data processing system including a plurality of subsystems including a memory, a plurality of I/O controllers and a central processor unit, all coupled in common to a system bus, the system comprising:

a monitor interface unit coupled to said system bus for receiving a plurality of system bus signals representative of information transferred between any two of said plurality of subsystems of said data processing system over said system bus and generating hit signals for predetermined signals of said plurality of system bus signals, said monitor interface unit comprising a plurality of programmable hit matrices, each responsive to said predetermined system bus signals for generating one of said hit signals for each of said predetermined system bus signals being transferred between said any two of said plurality of subsystems over said system bus, and monitor means having logic and counter means responsive to said hit signals for generating statistical data regarding occurrences of said predetermined signals on the system bus.

5. The data processing system of claim 4 wherein said programmable hit matrices comprise:

a plurality of random access memories s, each having a plurality of bit locations organized in a plurality of rows, each having a plurality of columns for storing a plurality of binary ONE bits in predetermined ones of said plurality of bit locations;

said plurality of random access memories, each being responsive to said selected system bus signals for selecting one of said plurality of rows and generating one of said hit signals for each of said columns in which one of the binary ONE bits is stored in the selected row.

6. A data processing system comprising a programmable hit matrix for receiving information signals from a data source on a system bus, and generating a hit signal when the information signals are equal to predetermined information signals transferred between subsystems on the system bus, said system comprising:

a random access memory having a plurality of bit locations organized in a plurality of rows, each of said rows having a plurality of columns for storing a plurality of binary ONE bits in predetermined bit locations said random access memory being responsive to said information signals on the system bus for selecting one of said rows and generating said hit signal in each of said plurality of columns in which said binary ONE bits are stored;

means for loading the plurality of binary ONE bits into the random access memory in response to signals on the system bus; and monitor means for receiving a plurality of hit signals and having logic and counter means responsive to the hit signals for generating statistical data.

* * * * *